(12) United States Patent
Sugai et al.

(10) Patent No.: US 8,992,651 B2
(45) Date of Patent: Mar. 31, 2015

(54) CERAMIC FILTER AND METHOD FOR MANUFACTURING THE SAME

(75) Inventors: Atsushi Sugai, Ibaraki (JP); Hiroshi Yamaguchi, Takatsuki (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 13/432,523

(22) Filed: Mar. 28, 2012

(65) Prior Publication Data

US 2013/0255211 A1     Oct. 3, 2013

(51) Int. Cl.
| | |
|---|---|
| *B01D 39/06* | (2006.01) |
| *B01D 39/20* | (2006.01) |
| *B01D 39/14* | (2006.01) |
| *B01D 24/00* | (2006.01) |
| *B01D 50/00* | (2006.01) |
| *C04B 35/591* | (2006.01) |
| *C04B 38/00* | (2006.01) |
| *C04B 38/02* | (2006.01) |
| *C04B 111/00* | (2006.01) |

(52) U.S. Cl.
CPC .......... *B01D 39/2075* (2013.01); *C04B 35/591* (2013.01); *C04B 38/0064* (2013.01); *C04B 38/02* (2013.01); *C04B 2111/00793* (2013.01); *C04B 2235/3222* (2013.01); *C04B 2235/3244* (2013.01); *C04B 2235/3882* (2013.01); *C04B 2235/428* (2013.01); *C04B 2235/661* (2013.01); *C04B 2235/767* (2013.01); *C04B 2235/78* (2013.01); *C04B 2235/96* (2013.01)
USPC ................ 55/523; 55/522; 55/524; 422/169; 422/170; 422/171; 422/172; 422/177; 422/178; 422/179; 422/180; 422/181; 422/182

(58) Field of Classification Search
CPC .......... B01D 2046/2433; B01D 46/00; B01D 45/00; F01N 3/0222; C04B 35/0009; C04B 35/565; C04B 35/591; C04B 35/195
USPC ............. 55/522–524; 422/169–172, 177–182
See application file for complete search history.

(56) References Cited

U.S. PATENT DOCUMENTS

| | | | | |
|---|---|---|---|---|
| 4,464,185 | A  * | 8/1984  | Tomita et al. .................. 55/310 |
| 6,669,751 | B1 * | 12/2003 | Ohno et al. .................... 55/523 |
| 7,704,296 | B2 * | 4/2010  | Merkel .......................... 55/523 |
| 7,727,613 | B2 * | 6/2010  | Suwabe et al. ............... 428/116 |
| 7,842,372 | B2   | 11/2010 | Tsuneyoshi et al. |
| 7,985,274 | B2 * | 7/2011  | Barataud-Dien et al. ....... 55/523 |
| 2004/0140596 | A1 * | 7/2004 | Satoh et al. ................... 264/656 |
| 2007/0158879 | A1 * | 7/2007 | Suwabe et al. ............... 264/630 |
| 2008/0022644 | A1 * | 1/2008 | DeRosa ......................... 55/523 |
| 2008/0202080 | A1 * | 8/2008 | Barataud-Dien et al. .... 55/385.3 |

FOREIGN PATENT DOCUMENTS

| | | |
|---|---|---|
| JP | 2002211983 A | 7/2002 |
| JP | 2005119934 A | 5/2005 |
| JP | 200824579 A  | 2/2008 |
| JP | 2008247716 A | 10/2008 |
| JP | 200911908 A  | 1/2009 |

* cited by examiner

*Primary Examiner* — Amber Orlando
(74) *Attorney, Agent, or Firm* — The Webb Law Firm

(57) ABSTRACT

[Problem] To provide a filter whose initial collection efficiency can be increased and whose pressure loss increase can be suppressed.

[Means to solve the problem] A ceramic filter includes: numerous crystalline masses bound to one another each formed of aggregation of columnar crystals, wherein a number of large diameter pores are present between the numerous crystalline masses, and small diameter pores are present between the numerous columnar crystals forming the crystalline mass.

1 Claim, 4 Drawing Sheets

Comparative Example     — 10 μm

— 10 μm

Comparative Example

Comparative Example

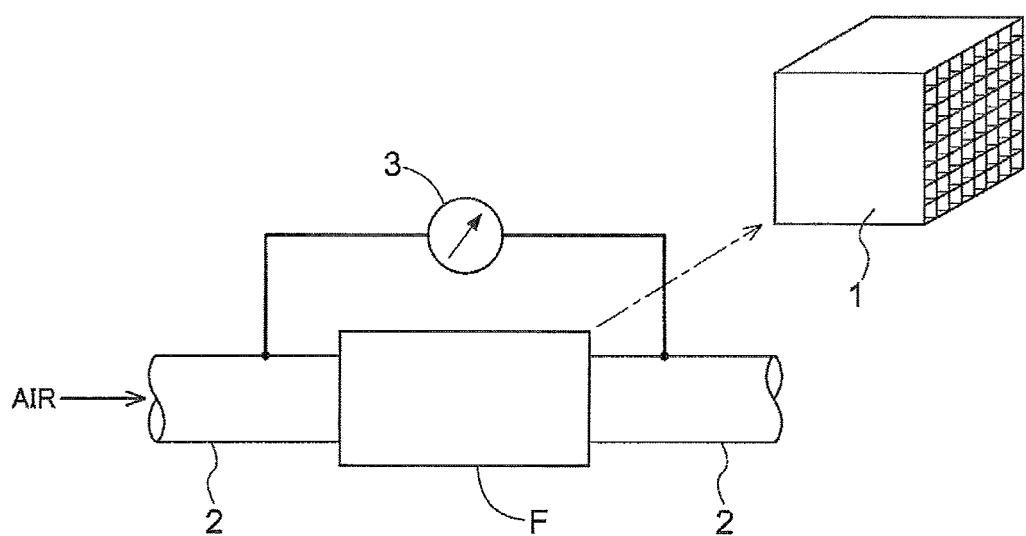

US 8,992,651 B2

CERAMIC FILTER AND METHOD FOR MANUFACTURING THE SAME

TECHNICAL FIELD

The present invention relates to a ceramic filter made of a material containing silicon as a main component and a method for manufacturing the same.

BACKGROUND ART

In general, a ceramic filter exhibits excellent thermal resistance and corrosion resistance and has been used for, for example, efficiently collecting particulate matter (hereinbelow, referred to as "PM") having a wide particle size distribution, such as soot exhausted from a diesel engine.

However, a relationship between PM collection efficiency and pressure loss tends to be incompatible. For example, when a pore size is too large, PM passes through the filter without being trapped, leading to low collection efficiency. When the pore size is too small, the pressure loss becomes large due to resistance to the passing gas, leading to an increase in a load on the engine, and further to clogging of the small pores, and as a result, increase in the pressure loss becomes drastic and a long-term use becomes difficult.

Therefore, there has been a conventional ceramic filter made of silicon carbide in which the collection efficiency and the pressure loss are adjusted (see, for example, Patent Document 1).

[Citation List]

Patent Literature

[Patent Document 1] Japanese Unexamined Patent Application Publication No. 2009-11908

SUMMARY OF THE INVENTION

Technical Problem

In the above-descried conventional ceramic filter made of silicon carbide, the initial collection efficiency is low, and therefore when microporosity is increased, clogging becomes drastic, and the filter is not satisfactory in terms of increase in pressure loss. After all, it has been considered that reducing microporosity is preferable.

Therefore, an object of the present invention is to increase the initial collection efficiency by solving the above-described problem, and to provide a filter in which the increase in the pressure loss can be suppressed well and a method for manufacturing the same.

Solution to Problem

A first feature of the present invention lies in that a filter includes: numerous crystalline masses bound to one another each formed of aggregation of columnar crystals, wherein a number of large diameter pores are present between the numerous crystalline masses, and a number of small diameter pores are present between the numerous columnar crystals forming the crystalline mass.

According to the first feature of the present invention, a number of large diameter pores are present between the crystalline masses. Therefore, increase in the pressure loss can be suppressed, and moreover, fine PM is likely to be trapped by the crystalline mass formed of the aggregation of the columnar crystals, and thus the collection efficiency can be increased.

In addition, even when a considerable amount of PM is trapped by the crystalline mass, a number of small diameter pores between the columnar crystals allow aeration, thus clogging hardly occurs and increase in the pressure loss can be suppressed.

Therefore, the filter can be used for long periods of time while the collection performance is retained high.

A second feature of the present invention lies in that a pore size distribution curve thereof has two maximum values, with a first maximum value being present in 8-25 μm, and a second maximum value being present in 0.2-3 μm.

According to the second feature of the present invention, in addition to the effect of the first feature of the present invention described above, the high collection efficiency and the suppression of increase in the pressure loss can be realized due to the pore size distribution with two maximum values.

A third feature of the present invention lies in that the columnar crystal is of a hexagonal system.

According to the third feature of the present invention, the crystalline structure is of a hexagonal system. Therefore, trapping of PM is facilitated and the collection efficiency can be increased. As a representative example of the ceramic having hexagonal columnar crystal, silicon nitride can be mentioned.

A fourth feature of the method for manufacturing the ceramic filter lies in that the method includes steps of: mixing, with a predetermined formula, a material containing: silicon as main component; and a pore-forming agent; shaping the mixture to obtain a product; and performing reaction sintering of the shaped product in nitrogen atmosphere, wherein 10-50% by mass of β-silicon nitride is incorporated into the material and the material is subjected to the reaction sintering.

According to the fourth feature of the present invention, by incorporating 10-50% by mass of β-silicon nitride into the material to be subjected to the reaction sintering, nitriding of metal silicon by β-silicon nitride, and thus the formation of the columnar crystals, are facilitated during sintering, and the crystalline mass of β-silicon nitride can be formed.

A fifth feature of the present invention lies in that, in the mixing step according to the fourth feature, a zirconium-containing material is further incorporated.

According to the fifth feature of the present invention, a rate of the nitriding of the metal silicon during the reaction sintering is further enhanced, and the formation of the columnar crystal is further facilitated.

BRIEF DESCRIPTION OF DRAWINGS

FIG. 7 is a schematic view showing test equipment for measuring change in pressure loss.

DESCRIPTION OF EMBODIMENTS

Hereinbelow, embodiments of the present invention will be described with reference to the drawings.

A ceramic filter of the present invention is excellent in thermal resistance, corrosion resistance and thermal shock resistance, and is used, for example, as a ceramic filter for filtering exhaust gas (hereinbelow, referred to as "DPF"), for the purpose of efficiently collecting PM having a wide particle size distribution, such as soot exhausted from a diesel engine.

In general, when a pressure upstream of the DPF is 12 kPa or higher, it is necessary to remove PM by burning off PM accumulated in the DPF (or regenerate the DPF) or, to exchange the DPF itself.

In addition, a collection performance (=collection efficiency) required for a high-performance DPF is 85% or more, and when the performance is below this value, it is difficult to meet the regulation value for PM emission.

Figure 1:
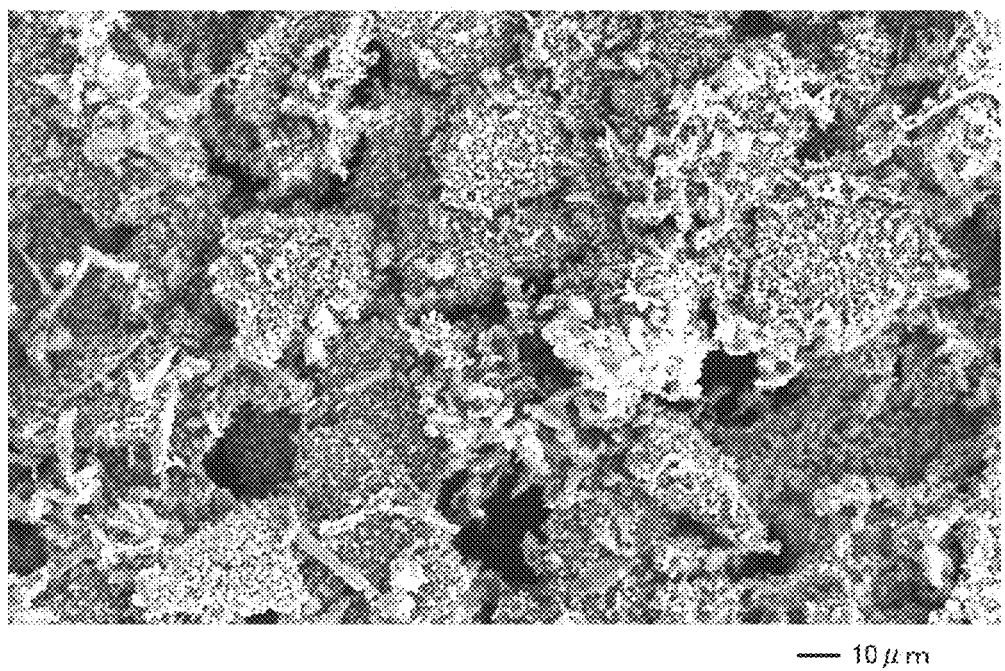
FIG. 1 is a photo of a silicon nitride filter of the present invention by scanning electron microscope.

Accordingly, as shown in the electron micrograph of FIG. 1, the ceramic filter of the present invention includes numerous crystalline masses bound to one another each formed of aggregation of hexagonal columnar crystals of β-silicon nitride ($Si_3N_4$), wherein a number of large diameter pores are present between the numerous crystalline masses, and a number of small diameter pores are present between the numerous columnar crystals forming the crystalline mass.

Figure 2:
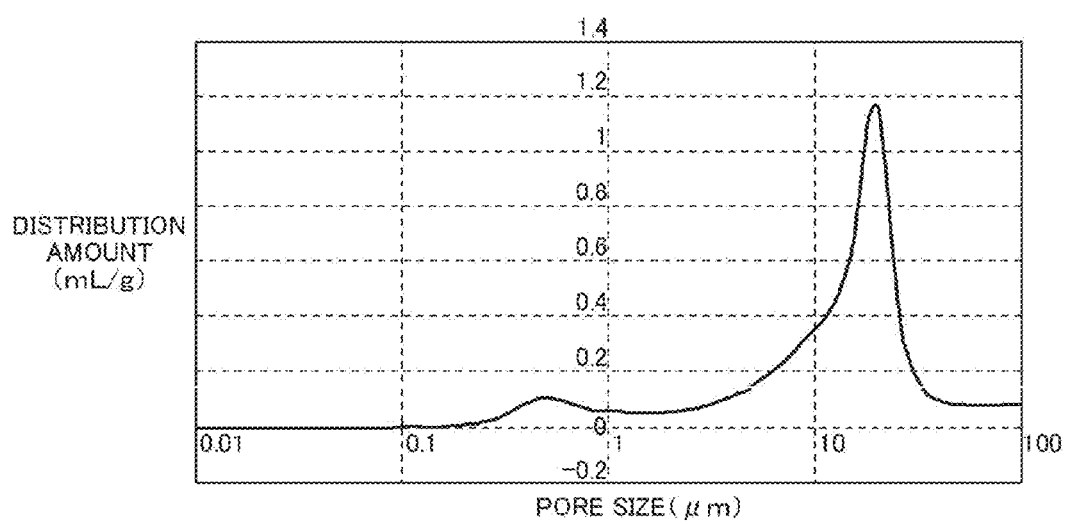
FIG. 2 is a graph showing a pore size distribution curve of the silicon nitride filter of the present invention.

With respect to the large diameter pore and the small diameter pore, as shown in FIG. 2, there are two maximum values in the pore size distribution curve, including a first maximum value present in a range of 8-25 μm, and a second maximum value present in a range of 0.2-3 μm. In addition, as shown in Table 1, the porosity is 50-65%, and the specific surface area is 0.6-0.75 $m^2$/cc.

TABLE 1

| ITEMS | DATA | REMARKS |
|---|---|---|
| POROSITY | 50-65% | (Void in volume) |
| PORE SIZE | 15-20 μm | (Average pore size, median diameter) |
|  | 15-25 μm | (Mode diameter) |
| RELATIVE DENSITY | 35-50% | — |
| SPECIFIC SURFACE AREA | 0.65-0.75 $m^2$/cc | — |
| CELL NUMBER | 200-300 cpsi (cell/1,000 $inch^2$) | √(cell number) = 14.1-17.3 cells/inch = Cell pore diameter 1.46-1.80 mm |
| CELL WALL THICKNESS | 12-14 mil (1/1,000 inch) | = 0.304-0.356 mm (1 inch = 25.4 mm) |
| THERMAL CONDUCTIVITY | Approximately 10 W/mK | — |
| COMPRESSIVE STRENGTH | 5-12 MPa | — |

Figure 3:
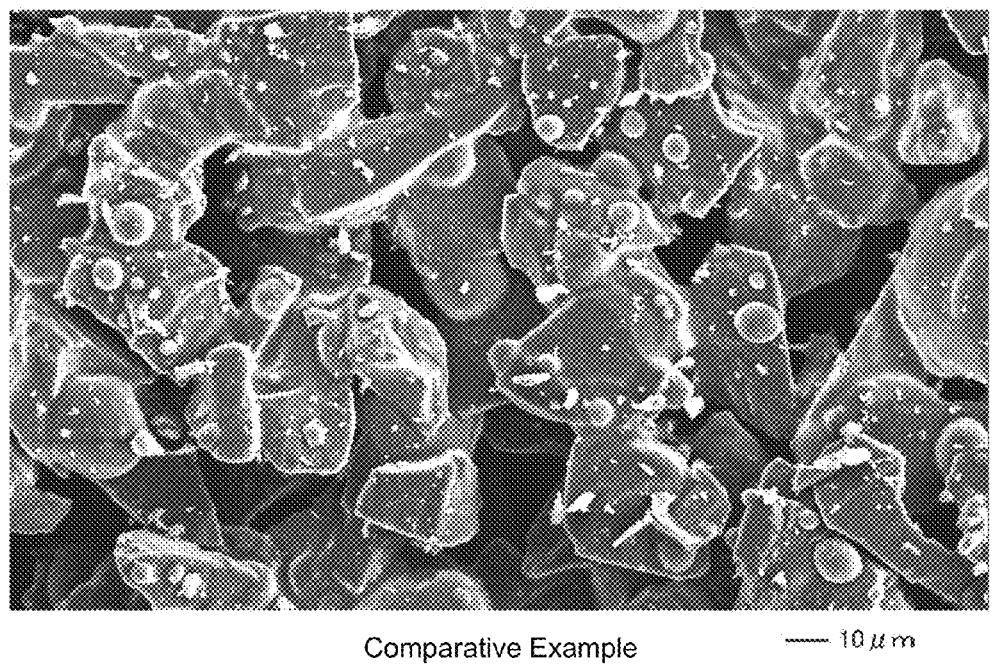
FIG. 3 is a photo of a silicon carbide filter according to Comparative Example by scanning electron microscope.
Figure 4:
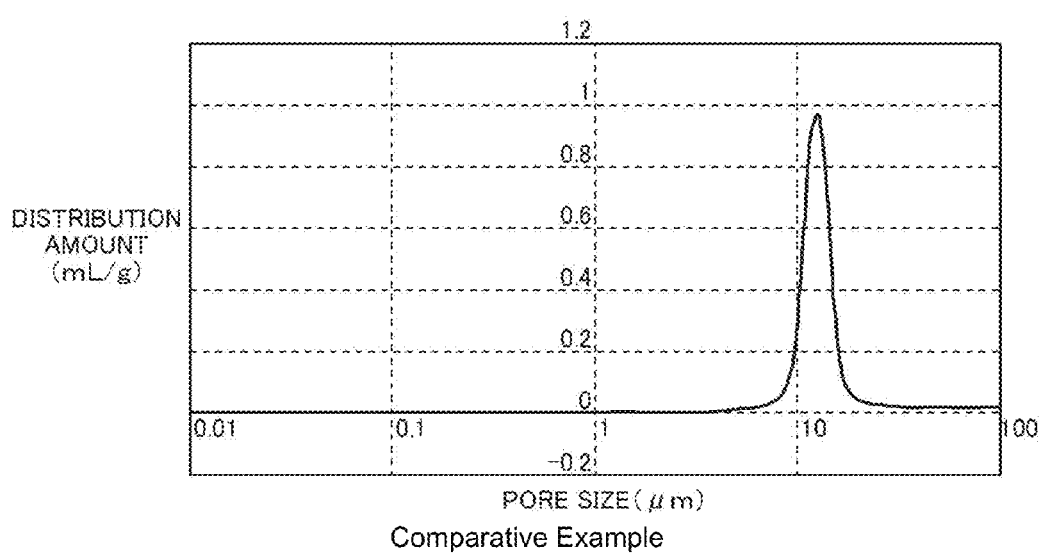
FIG. 4 is a graph showing a pore size distribution curve of the silicon carbide filter according to Comparative Example.

It should be noted that, as shown in the electron micrograph of FIG. 3 and FIG. 4, the conventional filter made of silicon carbide to be compared with the filter made of silicon nitride of the present invention has a single maximum value in the pore size distribution curve and is formed of simple-shaped particles bound together.

<Physical Properties>

A demonstration test was performed in which physical properties of the ceramic filter of the present invention were compared with those of the filter made of silicon carbide as Comparative Example, and the results are shown in the following Table 2 and FIGS. 5 and 6.

TABLE 2

|  |  | EXAMPLE Silicon nitride | COMPARATIVE EXAMPLE Silicon carbide |
|---|---|---|---|
| COLLECTION PERFORMANCE | Collection efficiency (initial: 0-20 min) | 93% | 89% |
|  | Collection efficiency (stationary) | 96% | 95% |
| PRESSURE LOSS | 1 hour later | 3.5 kPa | 3.5 kPa |
|  | 5 hours later | 9 kPa | 12 kPa |
|  | Time to pressure loss limit (12 kPa) | 390 min | 300 min |
| SPECIFIC SURFACE AREA | — | 0.68 $m^2$/cc | 0.23 $m^2$/cc |
| REDUCED WEIGHT | Relative value based on porosity | 67 | 100 |

With respect to the initial collection efficiency in Table 2, a filter paper was set to an exhaust outlet, and 20 minutes after the initiation of the operation, the collection efficiency of the filter was measured based on the cases of the presence and the absence of the filter. In addition, for examining the change in the pressure loss shown in FIGS. 5 and 6, the experimental equipment shown in FIG. 7 was used. A reference number 1 in FIG. 7 indicates a test specimen having a dimension of 50×50×150 mm in a shape of honeycomb with 260 CPSI, 13 mil, and the test specimen was disposed as filter F on an air passage 2. Five-hundred cc of exhaust gas from a diesel engine was passed therethrough, and a differential pressure (kPa) between upstream and downstream of the honeycomb was measured with a pressure gauge 3.

Figure 5:
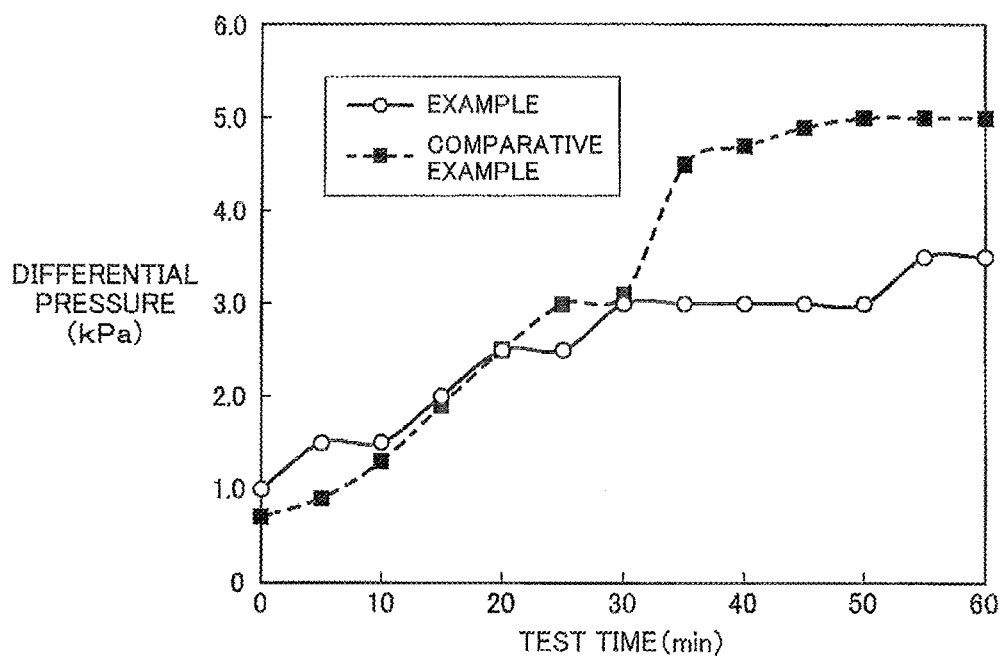
FIG. 5 is a graph showing change curves of initial pressure loss.
Figure 6:
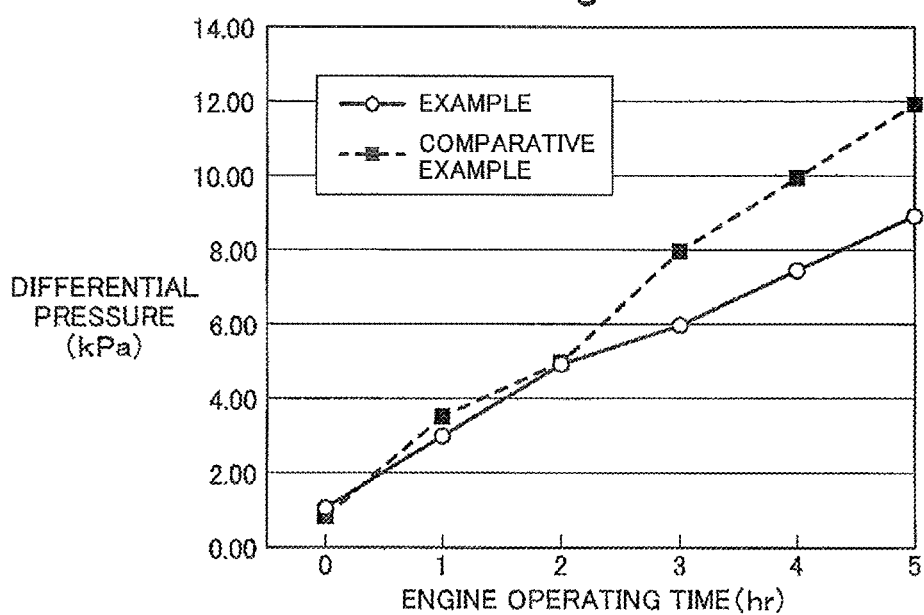
FIG. 6 is a graph showing change curves of long-term pressure loss.

FIG. 5 shows change curves of the pressure loss, especially at the initial stage, while FIG. 6 shows change curves of the pressure loss in the long term. According to these, at the initial stage, the filter of the present invention has higher pressure loss and collection efficiency than those of Comparative Example. In addition, in the long-term use, the filter of Comparative Example has higher pressure loss than that of the filter of the present invention, but there is no difference in the collection efficiency. This means that the filter of Comparative Example has the pore size and distribution that facilitate passing of PM to be collected at an initial stage, while the filter of the present invention has the collection efficiency which is kept high with a smaller change in the pressure loss and thus is suitable for the long-term use. The reason is believed to be the fact that the pores present in the filter of the present invention include not only the large diameter pores, but also the small diameter pores between the columnar crystals in the crystalline masses.

This is merely an estimation, but the reasons that the ceramic filter of the present invention has high collection efficiency while the increase in the pressure loss is suppressed may be that the small diameter pores between the columnar crystals in the crystalline masses have an effect of increasing the specific surface area in the filter, and the filter has a structure in which pores are highly in communication with one another due to the crystal shape.

<Manufacturing Method>

Method for manufacturing the silicon nitride filter of the present invention will be described.

The material include: 48% by mass of metal silicon (Si); 1.3% by mass of zirconium dioxide ($ZrO_2$); 1.3% by mass of alumina magnesia spinel ($MgAl_2O_4$); 25% by mass of β-silicon nitride (β-$Si_3N_4$); 13% by mass of a pore-forming agent; and 11.4% by mass of binders and the like.

After the material is prepared, a manufacturing step is performed with the following steps.

1. The above-described material is mixed and kneaded.
2. A honeycomb cylinder having a size of, for example, φ144 mm×150 mm, is formed using an extruder.
3. Degreasing is performed and then reaction sintering is performed in nitrogen atmosphere. A firing temperature is 1,000° C.-1,450° C. for a first stage firing, and 1,700° C.-below 1,800° C. for a second stage firing.
4. The product is subjected to processing, such as grinding and jointing.

As a product obtained by the above-manufacturing method, there can be mentioned a ceramic filter which is constituted of 95% by mass or more of (β-silicon nitride and the balance of other auxiliary agents, in which there are numerous crystalline masses each formed of the aggregation of the columnar crystals shown in FIG. 1 with a number of small diameter pores therebetween, and the crystalline masses are bound in such a manner that a number of large diameter pores are present therebetween.

Reference Signs List

1 Test specimen
2 Air passage
3 Pressure gauge
F Filter

The invention claimed is:

1. A ceramic filter comprises: numerous crystalline masses bound to one another each formed of an aggregation of columnar crystals,
   wherein a number of large diameter pores are defined by the numerous crystalline masses, and a number of small diameter pores are defined by the numerous columnar crystals forming the crystalline masses, the crystalline masses comprise β-silicon nitride, and the columnar crystal is of a hexagonal system, wherein a pore size distribution curve thereof has two maximum values, with a first maximum value being present in 8-25 μm, and a second maximum value being present in 0.2-3 μm.

* * * * *